T. Selleck,
Sharpening Rotary Saws.
N⁰ 931            Patented Sep. 19, 1838.

UNITED STATES PATENT OFFICE.

THADDEUS SELLECK, OF HAVERSTRAW, NEW YORK.

MACHINE FOR CUTTING THE TEETH OF CIRCULAR AND OTHER SAWS.

Specification of Letters Patent No. 931, dated September 19, 1838.

*To all whom it may concern:*

Be it known that I, THADDEUS SELLECK, of Haverstraw, in the county of Rockland and State of New York, have invented a new and useful Machine for the Cutting of Teeth in Circular and other Saws, and Also for Sharpening Them When Requisite; and I do hereby declare that the following is a full and exact description thereof.

Figure 1:
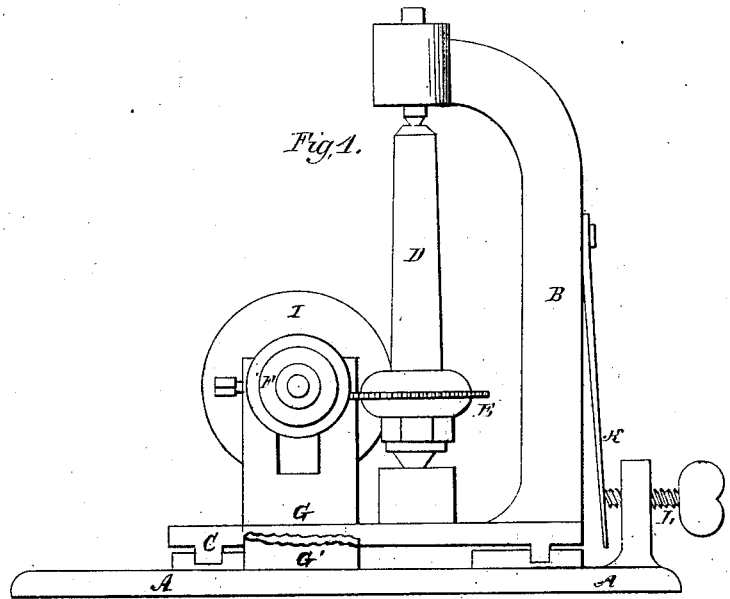
Figure 2:
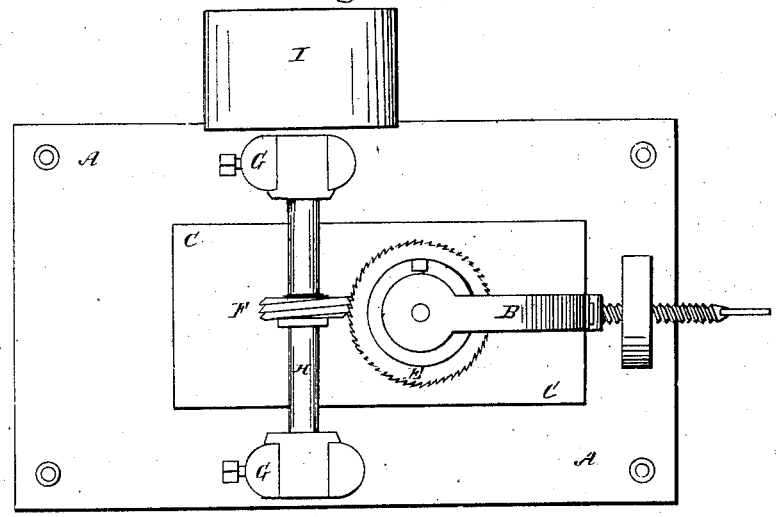

Figure 1, in the accompanying drawing shows a side view of the machine, and Fig. 2, a top view. A, A, is the basis of the machine, which may be of cast iron, and for a machine of small size may be 12 inches long, 4 inches wide, and a half inch thick.

B, B, is a standard supported upon the plate, but not affixed to it, but to a slide C, C, kept in place by guide pieces on the base A, A. There is a spindle D, which is capable of revolving on centers between the top of the standard B, and a step on C, C. This spindle receives the circular plates which are to have teeth cut upon them, these plates being held in place by screw nuts, as at C. Two or more plates may be so placed, and operated upon together, according to their thickness, and other circumstances.

F, F, is a circular steel cutter, the periphery, or cutting part of which has a thread cut upon it in the manner of a screw thread, but the form of which must be such as to adapt it to that of the teeth which are to be cut by it on the saws; the thread must also be so notched, channeled, or furrowed, as to adapt it to the purpose of cutting the steel plates with facility. The cutter which I have used, and found to answer well, is two inches and a quarter in diameter, and half an inch thick.

G, G, are two uprights or standards, in which the spindle H, of the cutter F, runs; in Fig. 1, the upright G', is supposed to be removed, for the purpose of showing the parts the more distinctly.

I, is a whirl for giving motion to the shaft H.

To cause the plates to be cut, to bear against the cutter, I have found the following device to answer well: K, is a spring attached to the standard B, against which spring a regulating screw L, may be made to bear with any desired degree of force, causing the standard and spindle to slide forward, and the saw plates to press regularly against the cutter, which will rapidly cut, or sharpen them.

It will be readily seen, by any competent machinist, that straight as well as circular saw plates may be advantageously cut, by a revolving cutter, as above described, said plates being confined upon a sliding bed, so constructed as to allow of its sliding with but little friction in a line adapted to the edge to be cut; as, in all cases, the feeding of the plates to the cutter so as to prevent the whole of the edge to be cut, successively to the cutter, is to be effected by the cutter itself, operating as an endless screw.

What I claim as my invention, and desire to secure by Letters Patent, is—

The employment of a circular revolving cutter having a thread, or channel, on its periphery, running in the manner of an endless screw, and so arranged and combined with the other parts of the machinery employed, as to cause said cutter to cut and to feed the plates to itself by its own action, the whole operating substantially in the manner above set forth.

THADDEUS SELLECK.

Witnesses:
LEONARD GWINN,
JOHN W. SHERWOOD.